(12) United States Patent
Hayakawa

(10) Patent No.: US 9,691,179 B2
(45) Date of Patent: Jun. 27, 2017

(54) COMPUTER-READABLE MEDIUM, INFORMATION PROCESSING APPARATUS, INFORMATION PROCESSING SYSTEM AND INFORMATION PROCESSING METHOD

(71) Applicant: NINTENDO CO., LTD., Kyoto (JP)

(72) Inventor: Takeshi Hayakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 279 days.

(21) Appl. No.: 13/934,804

(22) Filed: Jul. 3, 2013

(65) Prior Publication Data

US 2014/0125701 A1 May 8, 2014

(30) Foreign Application Priority Data

Nov. 6, 2012 (JP) .................................. 2012-244559

(51) Int. Cl.
*G06T 19/00* (2011.01)
*A63F 13/213* (2014.01)
*A63F 13/533* (2014.01)
*A63F 13/525* (2014.01)

(52) U.S. Cl.
CPC .......... *G06T 19/006* (2013.01); *A63F 13/213* (2014.09); *A63F 13/525* (2014.09); *A63F 13/533* (2014.09)

(58) Field of Classification Search
CPC .................................................. G06T 19/006
USPC ....................................................... 345/633
See application file for complete search history.

(56) References Cited

U.S. PATENT DOCUMENTS

| 5,969,704 A * | 10/1999 | Green | G06Q 30/02 345/474 |
| 2004/0051744 A1* | 3/2004 | Fukui et al. | 345/848 |
| 2007/0257915 A1* | 11/2007 | Kutaragi | G06F 3/011 345/427 |
| 2009/0262113 A1* | 10/2009 | Kotake et al. | 345/427 |
| 2012/0032977 A1* | 2/2012 | Kim | G06T 19/006 345/633 |
| 2012/0094773 A1* | 4/2012 | Suzuki | 463/43 |
| 2012/0194554 A1* | 8/2012 | Kaino et al. | 345/633 |

OTHER PUBLICATIONS

Kato et al., "An Augmented Reality System and its Calibration based on Marker Tracking" TVRST, 1999, vol. 4, No. 4.*

(Continued)

*Primary Examiner* — Devona Faulk
*Assistant Examiner* — Hai Tao Sun
(74) *Attorney, Agent, or Firm* — Nixon & Vanderhye, P.C.

(57) ABSTRACT

In an example system, a computer is caused to function as: a feature detection unit which detects a feature arranged in a real space; an image generation unit which generates an image of a virtual space including a virtual object arranged based on the feature; a display control unit which causes a display apparatus to display an image in such a manner that a user perceives the image of the virtual space superimposed on the real space; a processing specification unit which specifies processing that can be executed in relation to the virtual space, based on the feature; and a menu output unit which outputs a menu for a user to instruct the processing specified by the processing specification unit, in such a manner that the menu can be operated by the user.

14 Claims, 7 Drawing Sheets

(56) References Cited

OTHER PUBLICATIONS

Kato et al., "An Augmented Reality System and its Calibration based on Marker Tracking" *TVRSJ*, 1999, vol. 4, No. 4, partial translation attached, 11 pages.

Sasaki et al., Hand-Menu System: A Deviceless Virtual Input Interface for Wearable Computer. Transactions of the Virtual Reality Society of Japan, 2002, vol. 7, No. 3, pp. 393-402 with partial translation of p. 395, right column, line 1 to p. 396, right column, line 7 and p. 397, left column, lines 1 to 7.

* cited by examiner

COMPUTER-READABLE MEDIUM, INFORMATION PROCESSING APPARATUS, INFORMATION PROCESSING SYSTEM AND INFORMATION PROCESSING METHOD

This application is based upon and claims the benefit of priority of the prior Japanese Patent Application No. JP2012-244559, filed on Nov. 6, 2012, the entire contents of which are incorporated herein by reference.

FIELD

The present disclosure relates to an information processing program, an information processing apparatus, an information processing system and an information processing method for superimposing various kinds of information on a real space.

BACKGROUND AND SUMMARY

The present disclosure adopts the following composition in order to achieve the object described above. In other words, one example of an information processing program relating to the present disclosure is a computer-readable medium storing an information processing program which causes a computer to function as a feature detection unit which detects a feature arranged in a real space an image generation unit which generates an image of a virtual space including a virtual object arranged based on the detected feature a display control unit which causes a display apparatus to display an image in such a manner that a user perceives the image of the virtual space superimposed on the real space a processing specification unit which specifies processing that can be executed in relation to the virtual space, based on the feature; and a menu output unit which outputs a menu for a user to instruct the processing specified by the processing specification unit, in such a manner that the menu can be operated by the user.

Here, the display apparatus may be connected as a peripheral device to a computer which executes a program relating to the present disclosure, or may be connected to a computer via a communications network, or the like. Furthermore, the computer which is the subject that executes the program relating to the present disclosure may be constructed in a virtual environment, such as a so-called "cloud".

Furthermore, a feature arranged in the real space may be, for example, a so-called AR (augmented reality) marker, or a two-dimensional barcode, or other code. A feature of this kind may be attached to a component such as a card, or the like. Furthermore, the feature of this kind is not limited to a special marker or code, and so on. An article which is used for other purposes can also be employed as the feature, provided that it enables a display reference for the virtual object to be acquired.

According to the present disclosure, processing that can be executed in relation to the virtual space is specified based on a feature which is detected in the real space, and a menu for a user to instruct specified processing is output, whereby it is possible to impart variation corresponding to the features in the real space to the processing that can be executed in relation to the virtual space, in augmented reality technology.

There are no restrictions of the type of augmented reality technology to which the present disclosure can be applied. The present disclosure can be applied, for example, to augmented reality technology of a type in which a user perceives an image of a virtual space superimposed on a real space by displaying a composite image of a virtual space image synthesized with a captured image, and can also be applied to augmented reality technology of a type in which a user perceives an image of a virtual space superimposed on a real space by projecting a virtual space image in the field of view of the user (for example, a head-up display (HUD), or the like).

Furthermore, the program may further cause the computer to function as a captured image acquisition unit which acquires a captured image captured by an imaging apparatus, and the feature detection unit may detect a feature in the real space captured in the captured image, based on the captured image.

Moreover, the display control unit may enable a user to perceive an image of the virtual space superimposed on the real space, by causing the display apparatus to display a composite image in which the image of the virtual space is superimposed on the captured image.

Furthermore, the feature detection unit may detect a feature by which at least one of a type of the feature, a position and a posture thereof in the real space can be identified, and the processing specification unit may specify the processing by using at least one of the type of the feature, the position and the posture thereof in the real space, as identified based on the feature detected by the feature detection unit.

Moreover, the processing specification unit may specify the processing in accordance with at least one of the type of the feature, the position and the posture thereof as detected by the feature detection unit.

Furthermore, the processing specification unit may specify the processing in accordance with at least one of a relationship between types of a plurality of features, a relationship between positions thereof and a relationship between postures thereof, the plurality of features having been detected by the feature detection unit.

Moreover, the processing specification unit may, when there is one feature detected by the feature detection unit, specify the processing based on the feature, and when there is a plurality of features detected by the feature detection unit, specify the processing based on a relationship between the plurality of features.

By specifying processing that can be executed in accordance with a combination of a plurality of features, it is possible to vary the processing that can be executed in accordance with the relationship between features in the real space, and an augmented reality function having greater flexibility can be presented.

Furthermore, the program may also further cause the computer to function as an operation receiving unit which receives an operation by a user with respect to the menu; and a processing execution unit which executes processing in accordance with the operation by the user received by the operation receiving unit.

Moreover, the processing may be at least one of processing with respect to the virtual object, processing relating to actions of the virtual object, and processing with respect to the virtual space including the virtual object.

Furthermore, when a plurality of features is detected by the feature detection unit, the processing specification unit may specify the processing for each feature.

Moreover, when there is a plurality of combinations of features detected by the feature detection unit, the processing specification unit may specify the processing in accordance with the combinations.

Furthermore, the display apparatus may have a first display region and a second display region, the display control unit may cause the image of the virtual space to be displayed in the first display region, and the menu output unit may output the menu so as to be displayed in the second display region.

Moreover, the present disclosure can also be understood as an information processing apparatus, an information processing system including one or a plurality of information processing apparatuses, a method executed by a computer, or a program which is executed in a computer. Furthermore, the present disclosure may be a program of this kind recorded on a recording medium which can be read by a computer or other apparatus, machine, or the like. Here, a recording medium which can be read by a computer, or the like, is a recording medium on which information, such as data, a program, or the like, is stored by an electrical, magnetic, optical, mechanical or chemical action, and from which the information can be read by a computer, or the like.

DETAILED DESCRIPTION OF NON-LIMITING EXAMPLE EMBODIMENTS

Below, an embodiment of the present disclosure is described based on the drawings. The embodiment described below shows one example of implementing the present disclosure, and the present disclosure is not limited to the concrete composition described below. In implementing the present disclosure, the concrete composition may be adapted appropriately for each embodiment. For example, the present disclosure can be adapted to an information processing program which is executed in a computer of a portable information processing apparatus, or to an information processing apparatus, an information processing system including one or a plurality of information processing apparatuses, an information processing method, and the like.

<System Composition>

Figure 1:
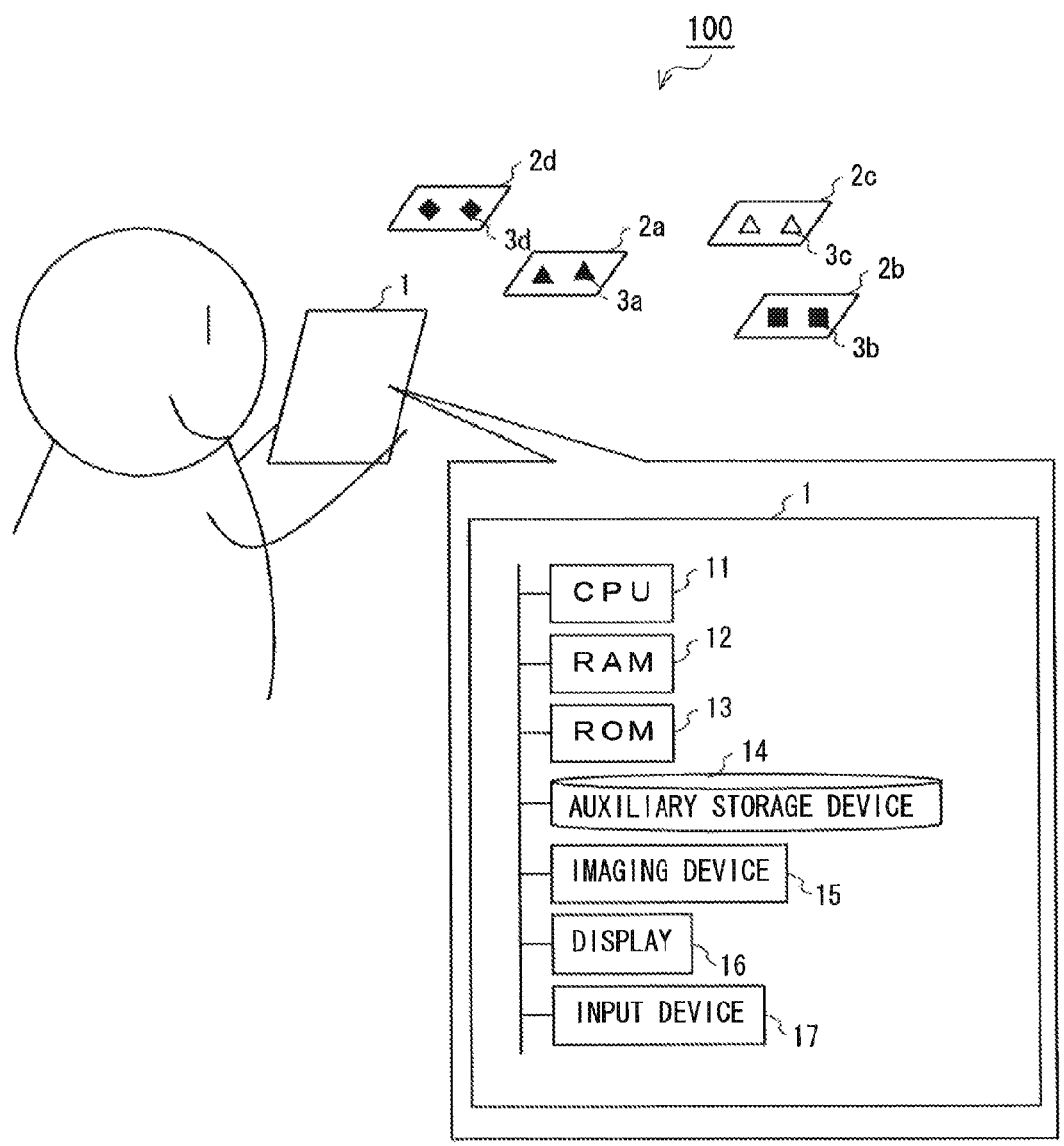
FIG. 1 schematically shows a non-limiting example of a system including an information processing apparatus FIG. 2 schematically shows a non-limiting example of a functional composition of an information processing apparatus

FIG. 1 is a diagram showing a composition of a system 100 relating to the present embodiment. The system 100 includes an information processing apparatus 1, and a plurality of cards 2a to 2d (referred to simply as "card(s) 2" below, unless the type of card is to be specified).

The information processing apparatus 1 is an information processing apparatus which is electrically connected to a central processing unit (CPU) 11, a random access memory (RAM) 12, a read only memory (ROM) 13, an auxiliary storage device 14, an imaging device 15, a display (display apparatus) 16, and an input device 17, such as buttons of various kinds, a touch panel, and the like. With regards to the specific hardware composition of the information processing apparatus 1, in each embodiment, constituent elements may be omitted, substituted or added, as appropriate.

The CPU 11 is a central processing unit which controls the respective constituent parts of the information processing apparatus 1, such as the RAM 12, and the auxiliary storage device 14, by processing commands and data developed in the RAM 12 and the ROM 13, and the like. Furthermore, the RAM 12 is a main storage apparatus, which is controlled by the CPU 11, and various commands and data are written to and read from the RAM 12. In other words, the CPU 11, the RAM 12 and the ROM 13 constitute a control unit of the information processing apparatus 1.

The auxiliary storage device 14 is a non-volatile storage apparatus, and information that is to be saved even when the power supply to the information processing apparatus 1 is switched off, for example, an operating system (OS) of an information processing apparatus 1 which is loaded into the RAM 12, various programs for executing the processing described below, various kinds of data used by the information processing apparatus 1, and the like, is written to and read from this auxiliary storage device 14. For the auxiliary storage device 14, it is possible to use an electrically erasable programmable ROM (EEPROM), or a hard disk drive (HDD), or the like. Furthermore, it is also possible to use a portable medium which can be installed detachably in the information processing apparatus 1, as the auxiliary storage device 14. An example of a portable medium is a memory card based on an EEPROM or the like, a compact disc (CD), a digital versatile disc (DVD), a Blu-ray disc (BD), or the like. An auxiliary storage device 14 based on a portable medium and an auxiliary storage device 14 which is not portable can be used in combination.

Markers 3a to 3d which are mutually different (referred to simply as "marker(s) 3" below unless the type of marker is to be specified) are applied to the cards 2a to 2d by a method such as printing. Each of these markers 3 corresponds to a virtual object which is displayed by the information processing apparatus 1, and is an indicator which indicates a reference for a position and posture when the virtual object corresponding to the marker 3 is displayed. In FIG. 1, there are four cards 2, but the number of cards 2 used may be one, or two or more number of cards may be used. Furthermore, respectively different markers 3a to 3d are applied to the cards 2a to 3d in order to display different virtual objects, but it is also possible to use cards 2 to which the same marker is applied.

In the present embodiment, a virtual object is synthesized and displayed at a prescribed position with respect to the associated marker 3, on a display 16 of the information processing apparatus 1. Furthermore, the virtual object has upward/downward, frontward/rearward and leftward/rightward directions. Therefore, the marker 3 may also be capable of identifying a display posture of the virtual object. In other words, the marker 3 may be a symbol, a text, a figure, a picture, or a combination of these, capable of identifying a position and a posture with respect to an imaging device 15, by capturing an image of the marker 3 by using an imaging device 15.

Next, the functions of the information processing apparatus 1 relating to the present embodiment will be described. The information processing apparatus 1 relating to the present embodiment is an information processing apparatus provided with a so-called AR function. The information processing apparatus 1 has a function for synthesizing a virtual object in a virtual space rendered by using a virtual camera, with a captured image of a real space which has been captured using an imaging device 15 and displaying the composite image on a display 16. In the present embodiment, the virtual object is three-dimensional image data. However, the virtual data may also be two-dimensional image data.

Figure 2:
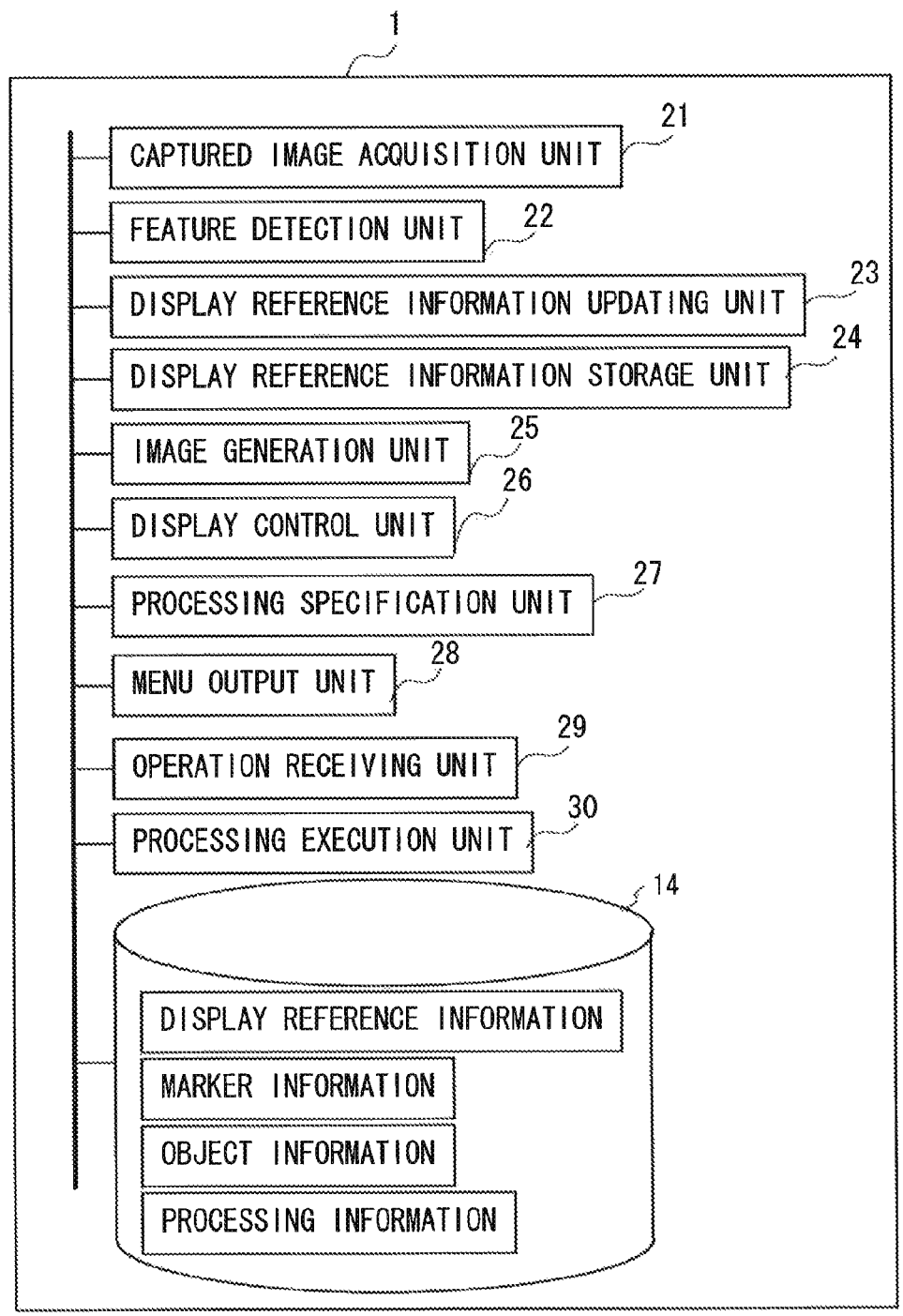

FIG. 2 is a diagram showing a schematic view of the functional composition of an information processing apparatus relating to the present embodiment. By the CPU 11 interpreting and executing various programs developed in the RAM 12, the information processing apparatus 1 relating to the present embodiment functions as an information processing apparatus provided with a captured image acquisition unit 21, a feature detection unit 22, a display reference information updating unit 23, a display reference information storage unit 24, an image generation unit 25, a display control unit 26, a processing specification unit 27, a menu output unit 28, an operation receiving unit 29 and a processing execution unit 30. The present embodiment is described here with respect to an example where each of these functions is executed by a generic CPU 11, but a portion or all of these functions may also be achieved by one or a plurality of dedicated processors.

The captured image acquisition unit 21 acquires a captured image which has been captured by the imaging device 15. The feature detection unit 22 is able to detect a marker 3 included in an image captured by the imaging device 15, by applying image processing, such as pattern matching, for example, to the captured image. The detection of a marker 3 is carried out by using an image recognition engine, for example.

The display reference information updating unit 23 acquires information forming a reference indicating a position and a posture in a space captured in the captured image, based on the detected marker 3, and updates the display reference information. In the present embodiment, even if the camera moves or the marker 3 moves, the display reference information stored by the display reference information storage unit 24 is updated in accordance with the most recent marker position and posture with respect to the camera.

The display reference information storage unit 24 stores display reference information for specifying a position and a posture of a virtual object which is arranged in a virtual space. In the present embodiment, the display reference information is a reference which is used in order to display the position and the posture of the virtual object in the virtual space. However, the display reference information may also be a reference which is used in order to show only one of the position or the posture of the virtual object in the virtual space. In the reference acquisition processing according to the present embodiment, in the display reference information, a marker coordinates system which uses three mutually orthogonal axes and takes a central point of the marker 3 as a point of origin is acquired for each marker 3. However, the display reference information may also use information that is not based on a marker coordinates system, for instance, information based on the captured image itself. Furthermore, it is also possible to share one marker coordinates system between a plurality of markers 3. By defining a coordinates system of the virtual space with reference to a marker 3 which is arranged in a real space, then it is possible to associate the real space and the virtual space. This association of the real space and the virtual space may employ a method other than one using a marker coordinates system.

In the present embodiment, the virtual object arranged in the virtual space is arranged in a marker coordinates system of a marker 3 which is associated with a virtual object. The marker coordinates system can be acquired by calculating the position and the posture of the marker 3 with respect to the imaging device 15, from the perspective of the marker 3 included in the captured image. The position and the posture of the virtual camera in the marker coordinates system coincide with the position and the posture of the imaging device 15 in the real space. Therefore, the virtual space is defined based on the marker 3, and if the position or imaging direction of the imaging device 15 changes in the virtual space, then the image of the virtual space displayed on the display 16 also changes.

The image generation unit 25 renders a virtual space image by arranging a virtual object having a position and a posture specified in accordance with the display reference information stored by the display reference information storage unit 24, in the virtual space, and generating an image of the virtual space viewed from the virtual camera. For the purpose of the AR function described above, the information processing apparatus 1 relating to the present embodiment generates a composite image in which a captured image acquired by the captured image acquisition unit 21 and a virtual space image including a virtual object generated by the image generation unit 25 are mutually superimposed.

The display control unit 26 displays the generated composite image on the display 16, which is a display apparatus. In so doing, the user can gain a sensation of the virtual object being actually present in the real space.

The processing specification unit 27 identifies the type, the combination, the number, the position and posture, and the like, of the markers, and specifies processing that can be executed in relation to the virtual space, based on the identified feature. The menu output unit 28 outputs a menu which allows a user to select and instruct the processing that can be executed as specified by the processing specification unit 27, in such a manner that the user can operate the menu.

In the AR function relating to the present embodiment, a function is provided which enables processing corresponding to an operation by the user with respect to the virtual space. In order to present a function of this kind, the operation receiving unit 29 receives an operation performed by the user, and the processing execution unit 30 executes processing in respect of the virtual space in accordance with the received operation by the user.

Next, the information held in the information processing apparatus 1 relating to the present embodiment will be described. The information processing apparatus 1 holds marker information, object information and processing information, in addition to the display reference information described above which is stored by the display reference information storage unit 24.

The marker information is information relating to a marker 3. The marker information includes, for example a marker ID for identifying a marker 3, a marker image, a marker size, a corresponding object ID, a virtual object position and posture, an object display size, and the like. The marker image is an image which shows the external appearance of the marker 3. Furthermore, the marker size is information indicating the size of the marker 3, such as the longitudinal length and lateral length of the marker 3. The display reference information updating unit 23 of the information processing apparatus 1 can acquire the distance between the imaging device 15 and the marker 3, and the posture of the marker 3, and the like, in other words, the position and posture information of the marker 3 and the marker coordinates system, from the viewpoint of the marker 3 included in the captured image, based on the marker image and the marker size. The corresponding object ID is an identification number of a virtual object which is displayed at a position corresponding to the marker 3. It is possible for two or more virtual objects to be associated with one marker 3. In the present embodiment, the marker information includes an object ID of a virtual object which is managed by means of the marker coordinates system. The position and posture of the virtual object are displayed at the position (coordinates values) and the posture (vector) in the marker coordinates system. There is marker information for each of the markers 3 which are used in the system 100.

The object information is information relating to a virtual object which is displayed at a position corresponding to the marker 3. The object information includes, for example, an object ID and object data for identifying the virtual object. There is object information for each of the objects used in the system 100.

The processing information is information relating to processing which is executed in respect of the virtual space. The processing information includes, for example a processing ID, content of an operation by the user which is the cause of the execution of the processing, a pointer indicating a program, or the like that is to be executed when an operation by the user is received, conditions for enabling execution of the processing, and the like. The processing information is saved for each process which can be instructed by the user. Here, the content of the operation by the user which is the cause of executing the processing is, for example, pressing of a related button, touching of a related icon displayed on a touch panel display (not illustrated), and the like.

Furthermore, the conditions can include conditions based on a detected marker. For example, the conditions are: the type of the detected marker (which can be judged by using the marker ID, etc.), the combination of a detected plurality of markers, the number of detected markers, the position and posture of detected markers, the positional relationship between a detected plurality of markers, and the like. Furthermore, the conditions may be a combination of the aforementioned various elements (the type of detected marker, the combination of a detected plurality of markers, the number of detected markers, the position and posture of detected markers, the positional relationship between a detected plurality of markers, and so on). Moreover, the processing executed in respect of the virtual space in the present embodiment may include processing with respect to the virtual object (such as attack processing against a virtual object in a game), processing relating to actions of a virtual object (such as virtual object animation processing), processing with respect to the virtual space including the virtual object (such as attack processing in respect of the virtual space in a game), and so on.

<Processing Flow>

Next, a flow of processing executed in the present embodiment will be described. The specific contents and processing sequence of the processing illustrated in the flowchart relating to the present embodiment are one example for implementing the present disclosure. The specific processing contents and processing sequence may be selected appropriately for each embodiment of the present disclosure.

Figure 3:
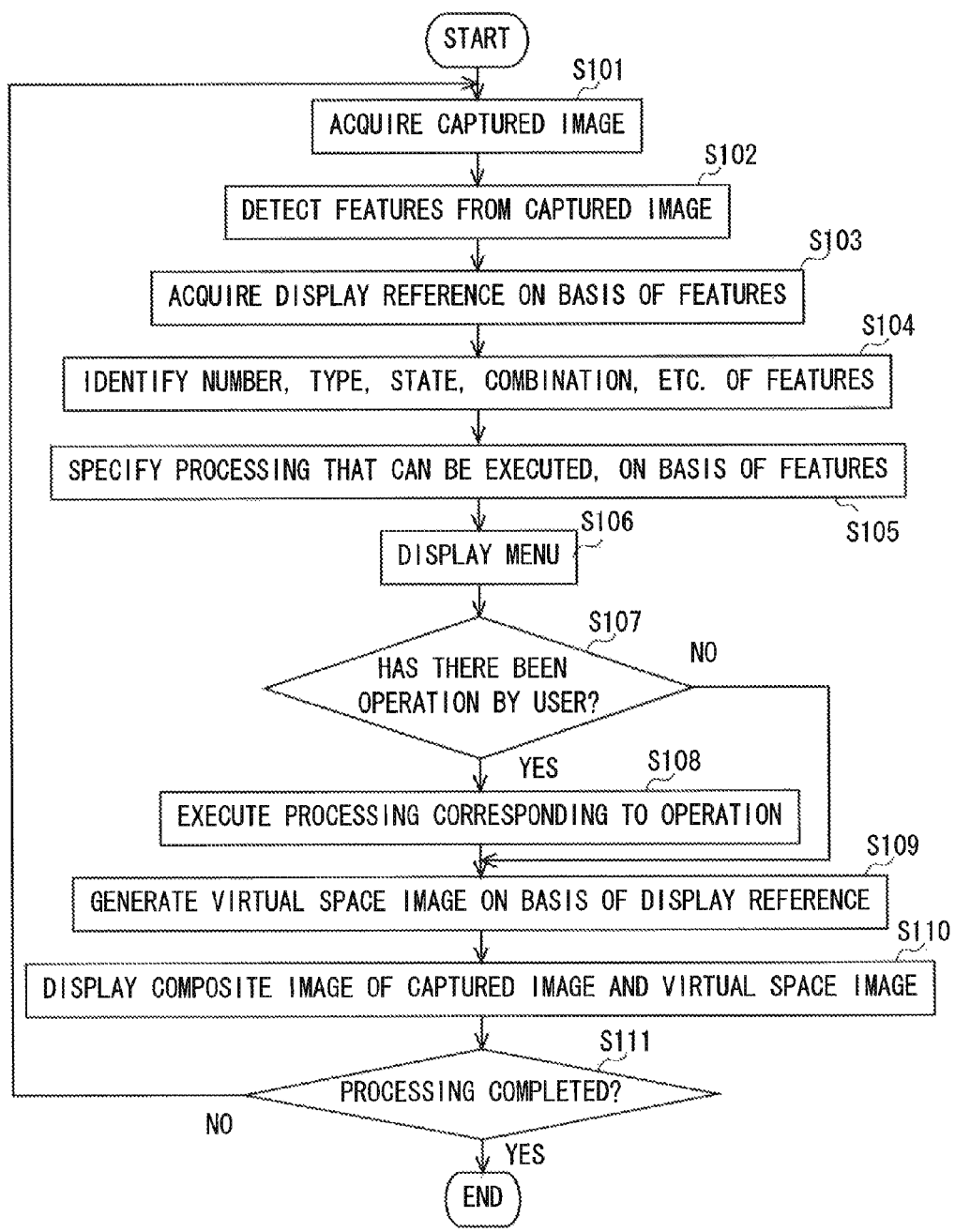
FIG. 3 shows a non-limiting example of a flowchart showing a flow of information processing

FIG. 3 is a flowchart showing a flow of information processing relating to the present embodiment. The information processing shown in the flowchart is started when an operation by the user for starting an AR function is received in the information processing apparatus 1. The information stored in the display reference information storage unit 24 is reset when the AR function is started up, and the display reference information storage unit 24 does not store display reference information at the start up of the AR function. The processing relating to the present embodiment is repeated for each of the frames, which are divided at a rate of 60 frames per second.

In step S101 and step S102, the captured image is acquired and markers 3 are detected from the captured image. The captured image acquisition unit 21 acquires a captured image which has been captured by the imaging device 15 (step S101). When a captured image is acquired, the feature detection unit 22 detects all of the markers 3 corresponding to the marker images contained in the marker information, from the captured image, as features in the captured space. The detection of markers 3 can be carried out by using a generic image recognition engine. Thereafter, the processing advances to step S103.

In step S103, reference acquisition processing is carried out for each marker 3. For each and every one of the detected markers 3, the display reference information updating unit 23 acquires position and posture information for the marker 3 in the real space, and updates the display reference information for each marker 3. More specifically, the display reference information updating unit 23 acquires the position and the posture of the marker 3 in the real space, based on the position of the marker 3 in the captured image, comparison results between the marker size included in the marker information and the size of the marker 3 included in the captured image, and distortion of the marker 3 in the captured image with respect to the marker image included in the marker information. The display reference information updating unit updates the display reference information based on the position and posture information of the markers in the real space, as acquired in this way. The processing then advances to step S104.

In step S104 and step S105, the processing that can be executed is specified based on the features. The processing specification unit 27 firstly specifies the type, the combination, the number, and the position and posture, and the like, of the markers (step S104). For example, the processing specification unit 27 can identify the type of each marker and the combination of the plurality of markers based on marker IDs of the detected markers. Furthermore, for instance, the processing specification unit 27 can identify the positional relationship between the markers from the relationship between the position and posture information of the plurality of markers acquired in step S103. The positional relationship specified here does not include an order of the markers or a relationship (angle, etc.) between the orientations of the markers.

The processing specification unit 27 specifies processing that can be executed in relation to the virtual space, based on the features (step S105). More specifically, by searching the processing information, the processing specification unit 27 extracts processing for which the type, the number, the state, the combination, and the like, of the features identified in step S104 satisfy the conditions for enabling execution of the processing, and specifies the extracted processing as allowed processing that can be executed in relation to the virtual space. The processing then advances to step S106.

In step S106, a menu is displayed. The menu output unit 28 outputs a menu, which can be operated by the user, in order to allow the user to select and instruct processing that can be executed which has been specified by the processing specification unit 27. The menu output unit 28 outputs a menu, which can be operated by the user, in order to allow the user to select and instruct processing that can be executed, by, for example, outputting a menu consisting of touch-operable icons associated with the processing that can be executed, on a touch panel display. The processing then advances to step S107.

In step S107, the presence and absence of a user operation is judged. The operation receiving unit 29 receives a user operation which instructs processing specified as processing that can be executed in step S105. The information processing apparatus 1 judges whether or not a user operation has been received by the operation receiving unit 29. If it is judged that an operation has been received, the processing advances to step S108. On the other hand, if it is judged that an operation has not been received, the processing advances to step S109.

In step S108, processing corresponding to the user operation is executed. The processing execution unit 30 executes the processing that can be executed corresponding to the user operation received by the operation reception unit 29. For example, the processing execution unit 30 executes the processing that is to be executed by a method such as using the received user operation to search for processing information, acquiring a pointer of a program for the processing obtained by the search, and executing the program indicated by the pointer. The specific contents of the processing to be executed are described below with reference to FIG. 4 to FIG. 7. The processing then advances to step S109.

In step S109, an image of a virtual space is generated. The image generation unit 25 renders an image of a virtual space including one or a plurality of virtual objects arranged in a marker coordinates system from the viewpoint of a virtual camera which is arranged at the same position as the imaging device 15 in the marker coordinates system, at least one of the position and the posture of the objects being specified in accordance with the display reference information. Object data for rendering the virtual object is acquired from the object information. The virtual object may be animated by changing every frame or every several frames. Animation can be carried out by, for example, changing an expression of a character which is a virtual object, or by moving a character. The processing then advances to step S110.

In step S110, display processing is carried out. The display control unit 26 generates a composite image in which an image of the virtual space is superimposed on the captured image, and this composite image is output to and displayed on the display 16.

As stated previously, the processing from step S101 to step S110 in the flowchart is executed for each frame. Therefore, the processing shown in the flowchart is repeated periodically from step S101, until the AR function is terminated (step S111) based on an operation by the user, or the like.

FIG. 4 to FIG. 7 show examples of a display screen of the display 16 in a case where an AR function is presented based on information processing relating to the present embodiment. The present embodiment is described with respect to an example of a display screen in a case where a display apparatus provided with two display regions is used. In the present embodiment, the display apparatus has an upper display region and a lower display region which are arranged one above the other. A composite image generated by superimposing the image of the virtual space on the captured image is displayed in the upper display region, and a menu for selecting processing that can be executed, by a user operation, is displayed in the lower display region. The display screens shown in FIG. 4 to FIG. 7 are examples of the implementation of the present disclosure and other display modes can be adopted. For example, the composite image and the menu may be superimposed and displayed in a single display region.

As described previously, the information stored in the display reference information storage unit 24 is reset at the start-up of the AR function, and the display reference information storage unit 24 does not store display reference information at the start-up of the AR function. Therefore, immediately after the AR function of the information processing apparatus 1 has been started up in accordance with an operation by the user, if the captured image does not include a marker, then no virtual object is arranged in the virtual space and only the captured image obtained by the imaging device 15 is displayed on the display 16.

When the marker 3 enters into the imaging range of the imaging device 15 and the captured image includes a marker 3, then the display reference information updating unit 23 updates the display reference information based on the marker 3 detected by the feature detection unit 22, and a virtual object is rendered at the position and the posture corresponding to the marker 3, by the image generation unit 25. Therefore, a composite image in which a virtual object is superimposed on the marker 3 is displayed on the display 16 (see FIG. 4 to FIG. 7).

Figure 4:
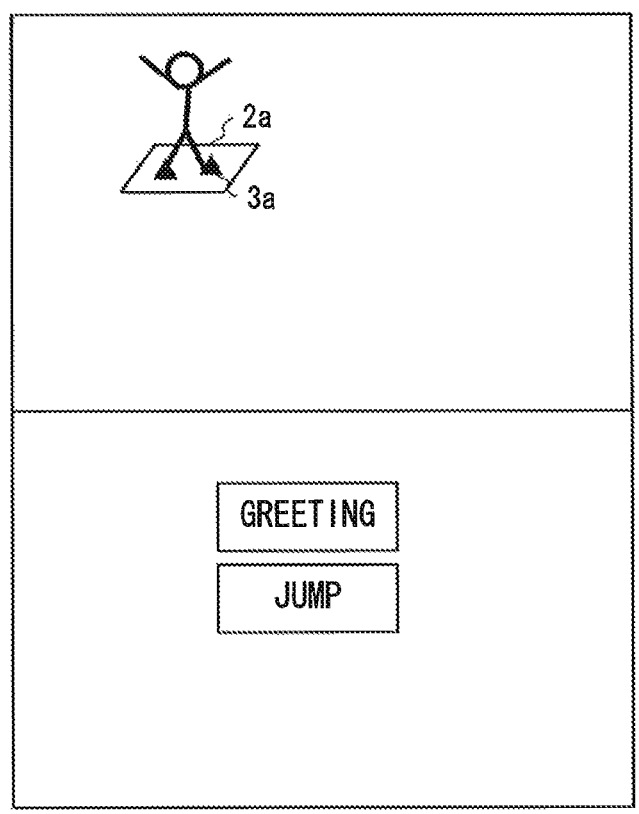
FIG. 4 shows a non-limiting example 1 of a display screen in a case where one marker is detected
Figure 5:
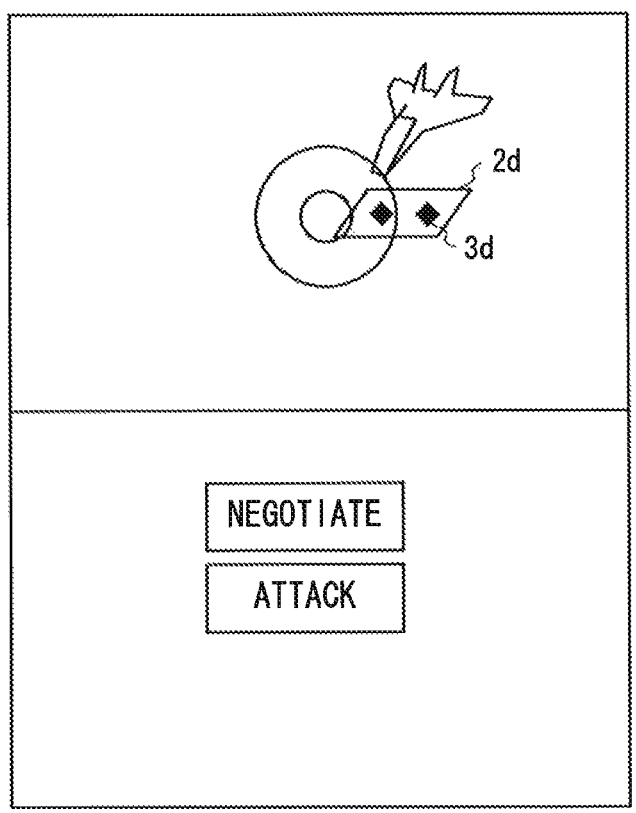
FIG. 5 shows a non-limiting example 2 of a display screen in a case where one marker is detected

FIG. 4 and FIG. 5 are diagrams showing examples of a display screen when one marker has been detected in the present embodiment. In the example shown in FIG. 4, a marker 3a attached to a card 2a is detected, and in the example shown in FIG. 5, a marker 3d which is different to the marker 3a in FIG. 4 (a marker 3d which is attached to a card 2d) is detected. Here, as stated previously, when a marker 3 is detected, the feature detection unit 22 refers to the marker information and acquires the marker ID of the marker 3. The processing specification unit 27 uses the marker ID to search for processing information and specifies the corresponding processing.

In the example shown in FIG. 4, the virtual object associated with the marker 3a is a virtual object of a character which is a friend in a game that is implemented using the AR function relating to the present embodiment, and therefore "greeting" or "jump" is acquired as processing that can be executed in relation to the virtual space. More specifically, the processing specification unit 27 extracts the processing "greeting" or "jump" by searching the processing information and identifying processing for which the condition is that the marker ID is the marker ID of a friend character. The "greeting" and "jump" extracted here is processing relating to actions of a virtual object in the virtual space. The user is able to display an animation of the character issuing a greeting, or jumping, by carrying out an operation of selecting any of the processing that can be executed, via the menus.

On the other hand, in the example shown in FIG. 5, the virtual object associated with the marker 3d is a virtual object of a character which is an enemy in the game, and therefore "negotiate" and "attack" are acquired as processing that can be executed in relation to the virtual space. More specifically, the processing specification unit 27 extracts the processing "negotiate" and "attack" by searching the processing information and identifying processing for which the condition is that the marker ID is a marker ID of an enemy character. The "negotiate" processing extracted here is processing with respect to a virtual object in the virtual space, and "attack" is processing with respect to the virtual space including the virtual object. The user is able to carry out a negotiation or an attack in the development of the game with respect to an enemy character, by performing an operation of selecting any of the processing that can be executed, via the menus.

Furthermore, in the description given above, the processing that can be executed varies depending on whether the character relating to the marker is a friend or an enemy in the game, but the types of marker are not limited to being classified as enemy or friend. For example, even in the case of a marker relating to an enemy character, it is possible to distinguish the type of enemy by the type of marker, and to specify respectively different attack methods as processing that can be executed, for each type of enemy. For example, it is possible to present variations whereby, for instance, if a marker of an enemy character which is a fighter plane is detected, then "fire machine gun" processing is specified based on the marker ID, and if a marker of an enemy character which is a tank is detected, then "fire rocket launcher" processing is specified based on the marker ID. By adopting this composition, it is possible to present the user with different game play in accordance with the type of marker. More specifically, according to the variation described above, game play for directly aiming at an enemy can be presented via a menu which includes "fire machine gun", and game play for aiming at an enemy while predicting a parabola-shaped trajectory can be presented via a menu which includes "fire rocket launcher".

Figure 6:
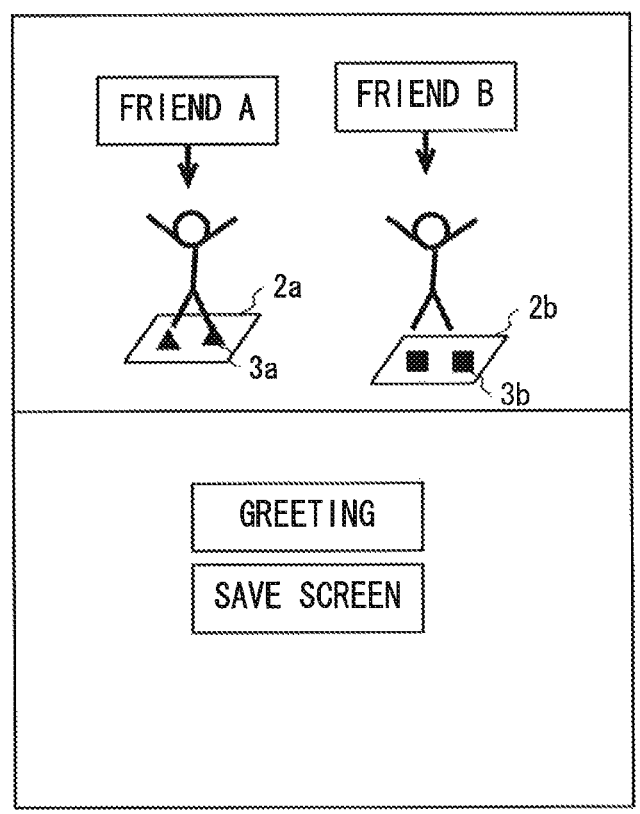
FIG. 6 shows a non-limiting example of a display screen in a case where two markers are detected.

FIG. 6 is a diagram showing one example of a display screen in a case where two markers are detected in the present embodiment. In the example shown in FIG. 6, the relationship between the character relating to the marker $3a$ and the character relating to the marker $3b$ is a friendly relationship in the game which is being played by using the AR function relating to the present embodiment, and therefore "greeting" and "save screen" are acquired as processing that can be executed in relation to the virtual space. More specifically, the processing specification unit 27 extracts the processing "greeting" and "save screen" by searching the processing information and identifying processing for which the condition is that the combination of a plurality of marker IDs is a friendly relationship. The user is able to display an animation of the characters issuing a greeting, or to save the displayed image, by performing an operation of selecting the menus.

According to the example shown in FIG. 6, it is possible to make the contents of the menu different, depending on the combination of markers. For example, if the relationship between the characters relating to a plurality of markers is an enemy relationship in the game, then "negotiate" processing and "attack" processing can be extracted.

Moreover, it is also possible to set the number of detected markers as a condition. For example, if the condition "the number of detected markers is no less than 3" is set for the processing "character of virtual object makes peace sign to everyone", then if the number of detected markers is two, processing corresponding to the combination of detected markers is specified, but if the number of detected markers is three or more, then the processing "character of virtual object makes peace sign to everyone" is specified as processing that can be executed.

Figure 7:
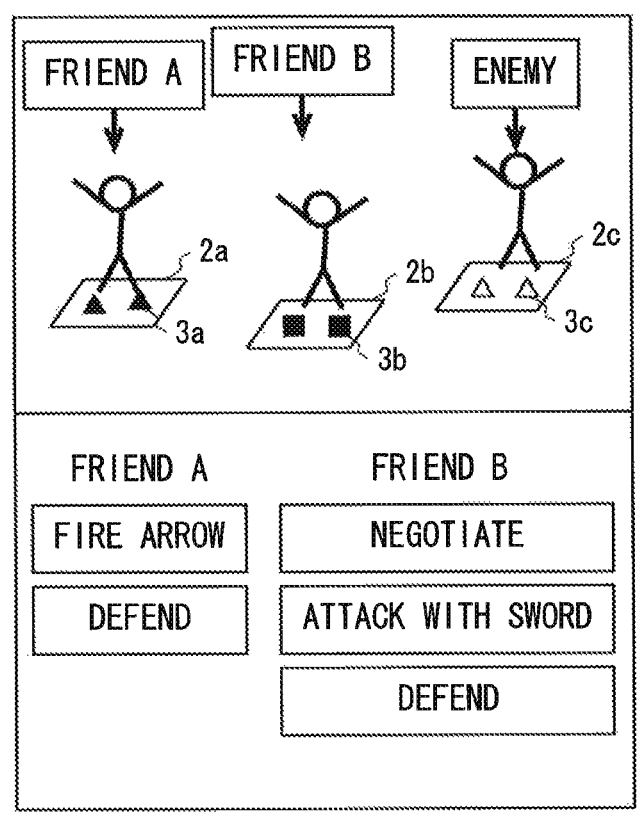
FIG. 7 shows a non-limiting example of a display screen in a case where three markers are detected.

FIG. 7 is a diagram showing one example of a display screen in a case where three markers are detected in the present embodiment. In the example shown in FIG. 7, the processing for operating the characters relating to the markers $3a$ and $3b$ is specified in accordance with the combination of markers, and a menu is displayed for each marker. In other words, if there is a plurality of combinations of the detected markers, then the processing specification unit 27 specifies processing that can be executed in respect of the combinations of markers.

Here, the processing for operating the characters relating to the markers is specified based on the combination of markers and the positional relationship with an enemy. More specifically, the combination of the marker $3a$ and the marker $3c$ is an enemy relationship, and the positional relationship between the marker $3a$ and the marker $3c$ is a positional relationship in which another marker $3b$ is arranged therebetween. Therefore, the processing specification unit 27 extracts, and specifies as processing that can be executed, the processing ("fire arrow" and "defend") for which the conditions are "combination having enemy relationship" and "other marker present therebetween", based on the processing information. On the other hand, the combination of the marker $3b$ and the marker $3c$ is an enemy relationship and the positional relationship between the marker $3b$ and the marker $3c$ is a positional relationship in which another marker 3 is not arranged therebetween. Therefore, the processing specification unit 27 extracts, and specifies as processing that can be executed, the processing ("negotiate", attack with sword" and "defend") for which the conditions are "combination having an enemy relationship" and "no other marker present therebetween", based on the processing information.

<Variation of the Embodiment>

In the embodiment described above, the display control unit 26 causes the display apparatus to display a composite image in which an image of a virtual space is superimposed on a captured image, whereby the user is able to perceive the image of the virtual space superimposed on a real space. However, the display control unit 26 is not limited to a method which displays a composite image, provided that an image is displayed on the display apparatus in such a manner that the user perceives an image of the virtual space superimposed on the real space. For example, the present disclosure can also be applied to augmented reality technology of a type which enables a user to perceive an image of a virtual space superimposed on a real space by projecting an image of a virtual space in a user's field of vision, such as a head-up display (HUD) or another method which projects an image of a virtual space onto glasses worn by the user, and so on.

Furthermore, the embodiment described above relates to an example where a marker coordinates system is used as display reference information, but the display reference information may be information obtained from the real space which can be used as a reference for at least one of the position and the posture of a virtual object in a virtual space. For example, the display reference information may be a captured image itself. If a captured image is used as display reference information, then the image generation unit 25 extracts a display reference for the virtual object from a captured image which is stored as the display reference information, for each image frame.

While certain example systems, method, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an information processing program which, when executed by a computer communicably coupled to an imaging device, causes the computer to perform operations comprising:

detecting, based upon information including an image of a real space captured by the imaging device, a marker arranged in the real space;

generating an image of a virtual space including a virtual object arranged based on the detected marker;

causing a display apparatus to display an image in such a manner that the image of the virtual space is superimposed on the image of the real space;

storing processing information including processing that can be executed in relation to the virtual space and a condition for enabling execution of the processing, wherein the condition includes at least a combination of detected markers, and wherein the processing is processing relating to actions of the virtual object;

searching, when two or more markers are detected by said detecting, the stored processing information and extracting processing for which the detected two or more markers satisfy the stored condition; and outputting a menu configured for a user to instruct the extracted processing, in such a manner that the menu can be operated by the user.

2. The non-transitory computer-readable storage medium storing an information processing program according to claim 1, wherein the computer detects a marker by which at least one of a type of the marker, a position and a posture thereof in the real space can be identified, and wherein the computer identifies the processing by using at least one of the type of the detected marker, the position and the posture thereof in the real space.

3. The non-transitory computer-readable storage medium storing an information processing program according to claim 2, wherein the computer identifies the processing in accordance with at least one of the type of one of the detected markers the position and the posture thereof.

4. The non-transitory computer-readable storage medium storing an information processing program according to claim 3, wherein the computer identifies the processing in accordance with at least one of a relationship between types of a plurality of markers, a relationship between positions thereof and a relationship between postures between thereof, of the detected plurality of markers.

5. The non-transitory computer-readable storage medium storing an information processing program according to claim 4, wherein when there is a plurality of markers detected by the computer, specifying the processing based on a relationship between the plurality of markers.

6. The non-transitory computer-readable storage medium storing an information processing program according to claim 1, further causing the computer to perform operations comprising:

receiving an operation by a user with respect to the menu; and executing processing in accordance with the received operation.

7. The non-transitory computer-readable storage medium storing an information processing program according to claim 1, wherein the processing is at least one of processing with respect to the virtual object and processing with respect to the virtual space including the virtual object.

8. The non-transitory computer-readable storage medium storing an information processing program according to claim 1, wherein when there is a plurality of combinations of markers detected by the computer, specifying the processing in accordance with the combinations.

9. The non-transitory computer-readable storage medium storing an information processing program according to claim 1, further causing the computer to perform operations comprising:

acquiring a captured image captured by an imaging apparatus, wherein the computer detects a marker in the real space captured in the captured image, based on the captured image.

10. The non-transitory computer-readable storage medium storing an information processing program according to claim 9, wherein the computer enables a user to perceive an image of the virtual space superimposed on the real space, by causing the display apparatus to display a composite image in which the image of the virtual space is superimposed on the captured image.

11. The non-transitory computer-readable storage medium storing an information processing program according to claim 1, wherein the display apparatus has a first display region and a second display region, and wherein the computer is configured to:

cause the image of the virtual space to be displayed in the first display region; and output the menu so as to be displayed in the second display region.

12. An information processing apparatus comprising:

an interface connectable to an image capture device; and at least one processor communicably coupled to the interface, and configured to perform operations comprising:

detecting, based upon information including an image of a real space captured by the image capture device, a marker arranged in the real space;

generating an image of a virtual space including a virtual object arranged based on the detected marker;

causing a display apparatus to display an image in such a manner that a user perceives the image of the virtual space superimposed on the image of the real space;

storing processing information including processing that can be executed in relation to the virtual space and a condition for enabling execution of the processing, wherein the condition includes at least a combination of detected markers, and wherein the processing is processing relating to actions of the virtual object;

searching, when two or more markers is detected by said detecting, the stored processing information and extracting processing for which the detected two or more markers satisfy the stored condition;

and outputting a menu configured for a user to instruct the extracted processing, in such a manner that the menu can be operated by the user.

13. An information processing system comprising:

a component to which a marker is attached, a position and a posture of the marker with respect to an imaging apparatus being identifiable when an image of the marker is captured by the imaging apparatus; and an information processing apparatus, wherein the information processing apparatus includes at least one processor configured to perform operations comprising:

detecting, based upon information including an image of a real space captured by the imaging apparatus, a marker arranged in the real space;

generating an image of a virtual space including a virtual object arranged based on the detected marker;

causing a display apparatus to display an image in such a manner that a user perceives the image of the virtual space superimposed on the image of the real space;

storing processing information including processing that can be executed in relation to the virtual space and a condition for enabling execution of the processing, wherein the condition includes at least a combination of detected markers, and wherein the processing is processing relating to actions of the virtual object;

searching, when two or more markers is detected by said detecting, the stored processing information and extracting processing for which the detected two or more markers satisfy the stored condition; and outputting a menu configured for a user to instruct the extracted processing, in such a manner that the menu can be operated by the user.

14. An information processing method for causing a computer to execute:

detecting, in an image of a real space captured by an imaging device, a marker arranged in the real space;

generating an image of a virtual space including a virtual object arranged based on the detected marker;

causing a display apparatus to display an image in such a manner that a user perceives the image of the virtual space superimposed on the image of the real space;

storing processing information including processing that can be executed in relation to the virtual space and a condition for enabling execution; of the processing, wherein the condition includes at least a combination of detected markers, and wherein the processing is processing relating to actions of the virtual object;

searching, when two or more markers is detected by said detecting, the stored processing information and extracting processing for which the detected two or more markers satisfy the stored condition;

and outputting a menu configured for a user to instruct the extracted processing, in such a manner that the menu can be operated by the user.

* * * * *

UNITED STATES PATENT AND TRADEMARK OFFICE
CERTIFICATE OF CORRECTION

PATENT NO. : 9,691,179 B2
APPLICATION NO. : 13/934804
DATED : June 27, 2017
INVENTOR(S) : Hayakawa It is certified that error appears in the above-identified patent and that said Letters Patent is hereby corrected as shown below:

Column 14, Line 51, please delete "is" and replace with --are--.

Column 15, Line 15, please delete "is" and replace with --are--.

Column 16, Line 10, after execution please delete ";".

Column 16, Line 14, please delete "is" and replace with --are--.

Signed and Sealed this
Twenty-fourth Day of April, 2018

Andrei Iancu
*Director of the United States Patent and Trademark Office*